(12) United States Patent
Yamamoto et al.

(10) Patent No.: US 7,636,503 B2
(45) Date of Patent: Dec. 22, 2009

(54) WAVELENGTH SELECTIVE SWITCH

(75) Inventors: Tsuyoshi Yamamoto, Kawasaki (JP);
Tamotsu Akashi, Kawasaki (JP); Kohei Shibata, Kawasaki (JP); Hirofumi Aota, Kawasaki (JP); Shinji Yamashita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 116 days.

(21) Appl. No.: 12/073,896

(22) Filed: Mar. 11, 2008

(65) Prior Publication Data

US 2009/0060416 A1    Mar. 5, 2009

(30) Foreign Application Priority Data

Mar. 29, 2007    (JP) ............... 2007-087332

(51) Int. Cl.
*G02B 6/26* (2006.01)
*G02B 6/42* (2006.01)
*G02B 26/08* (2006.01)
*G02B 26/10* (2006.01)
*G02B 26/12* (2006.01)
*G02F 1/29* (2006.01)
*H04J 14/00* (2006.01)

(52) U.S. Cl. ............... 385/18; 385/17; 385/37; 359/201.2; 359/204.1; 359/320; 398/48; 398/49; 398/50

(58) Field of Classification Search .......... 385/17, 385/18, 22, 37; 356/298, 223.1, 201.1, 201.2, 356/204.2, 204.4, 204.5, 850, 279, 290, 291, 356/320; 398/48–50, 84, 87
See application file for complete search history.

(56) References Cited

U.S. PATENT DOCUMENTS 6,661,948 B2    12/2003   Wilde
7,447,399 B2 *  11/2008   Aota et al. ............... 385/18

* cited by examiner

*Primary Examiner*—Frank G Font
*Assistant Examiner*—Robert Tavlykaev
(74) *Attorney, Agent, or Firm*—Staas & Halsey LLP (57) ABSTRACT

A wavelength selective switch of the present invention angularly disperses lights output from a plurality of input ports of an input and output optical system, to an X-direction, according to wavelength, by a diffraction grating to supply the dispersed lights to a condenser lens. The condenser lens is arranged so that a center axis thereof is shifted to the X-direction relative to an axis passing through the center of spreading angle to the X-direction of output beams from the diffraction grating, and accordingly, at a non-operating time, the light of each wavelength passed through the condenser lens is incident on each movable mirror being tilted by an offset angle corresponding to a shift amount of the condenser lens. As a result, it becomes possible to block the connection between an input side and an output side at the non-operating time without degrading the performance at an operating time.

8 Claims, 12 Drawing Sheets

FIG.3

(TOP VIEW)

FIG.4

(ENLARGED TOP VIEW)

NON-OPERATING TIME
BLOCKED STATE

OPERATING TIME
CONNECTION STATE

FIG.8
(TOP VIEW)

RELATED ART

FIG.13

RELATED ART

FIG.14
RELATED ART
(TOP VIEW)

FIG.15
RELATED ART
(SIDE VIEW)

US 7,636,503 B2

WAVELENGTH SELECTIVE SWITCH

BACKGROUND OF THE INVENTION

1. Field of the Invention

The present invention relates to a wavelength selective switch which separates a wavelength division multiplexed light for each wavelength by a spectral element, and thereafter, condenses the separated lights using a lens to reflect the condensed lights by movable mirrors, to thereby switch paths for the lights of respective wavelengths, and in particular, to a wavelength selective switch by which the connection between an input side and an output side is blocked at a non-operating time.

2. Description of the Related Art

In a photonic network of which connection between nodes is a ring type or a mesh type, there has been adopted a structure in which, in the case where a failure occurs in a certain node or a certain path, in order to avoid the degradation of communication service over the entire network, an optical signal is transmitted via a node or a path in which a failure does not occur, to improve the communication reliability. Further, when the node or the path is restored from the failure, the setting of an optical switch in each node is made based on a previously determined rule. Therefore, in the optical switch which is in a non-operating state due to any apparatus failure, if the path between an input side and an output side is connected, there is caused a problem in that the network is unintentionally connected. In order to solve such a problem, for the optical switch on each node, it is required that the connection between the input side and the output side is blocked at the non-operating time.

As one of optical switches capable to be arranged on each node of the photonic network as described above, there has been proposed a wavelength selective switch by which optical directions are switched using movable mirrors (refer to U.S. Pat. No. 6,661,948).

Figure 12:
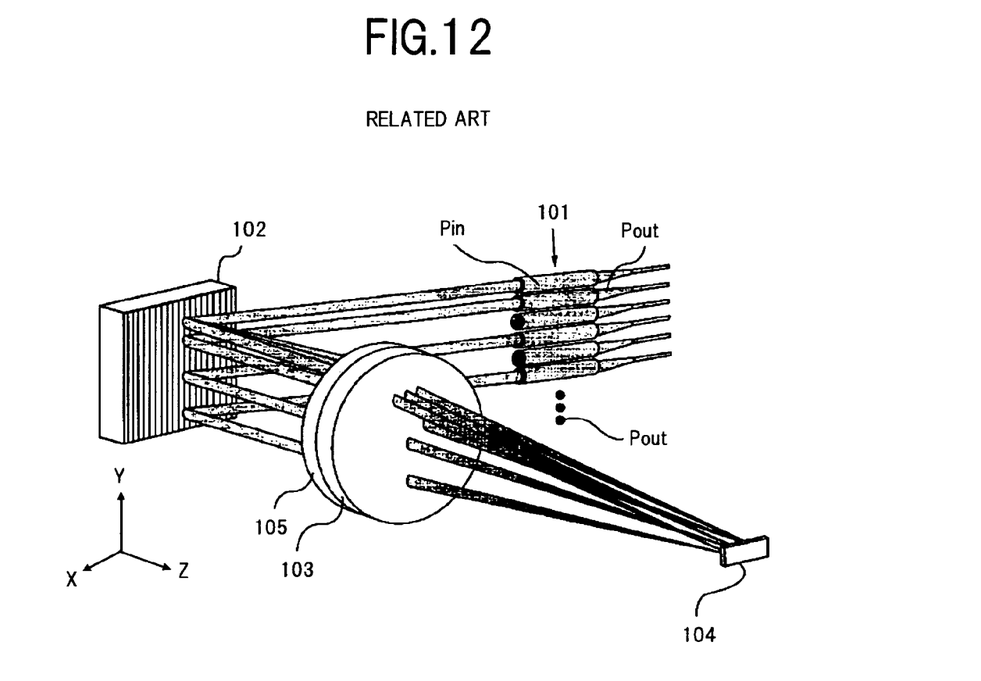
FIG. 12 is a perspective view showing a configuration example of a conventional wavelength selective switch using a reflective type diffraction grating.

FIG. 12 is a perspective view showing a configuration example of a conventional wavelength selective switch. This conventional wavelength selective switch comprises: a fiber collimator array 101; a diffraction grating 102; a condenser lens 103; a mirror array 104; and a ¼ wave plate 105. In the fiber collimator array 101, N ($\geqq$3) fiber collimators are arranged in one direction, to make up one input port and a plurality of output ports. A WDM light output from the input port is separated to different angle directions, according to wavelengths, by the diffraction grating 102, and thereafter, the lights of respective wavelengths are condensed on different positions by the condenser lens 103. On condensing positions of the lights of respective wavelengths, there is arranged the mirror array 104 provided with a plurality of movable mirrors corresponding to the number of wavelengths. Each movable mirror is a micro-mirror which is formed using, for example, a Micro Electro Mechanical Systems (MEMS) technology and an angle of a reflecting surface thereof is controllable according to a drive signal. The lights of respective wavelengths reached the mirror array 104 are reflected respectively by the movable mirrors corresponding thereto, to be turned to directions according to the angles of the reflecting surfaces of the movable mirrors. At this time, the reflecting surface of each of the movable mirrors is controlled to a predetermined angle corresponding to a position of any one of output ports, which is set as the output destination of a light to be input, so that the lights of respective wavelengths turned by the movable mirrors pass through the condenser lens 103, the ¼ wave plate 105 and the diffraction grating 102, to be led to the destination output port.

Figure 13:
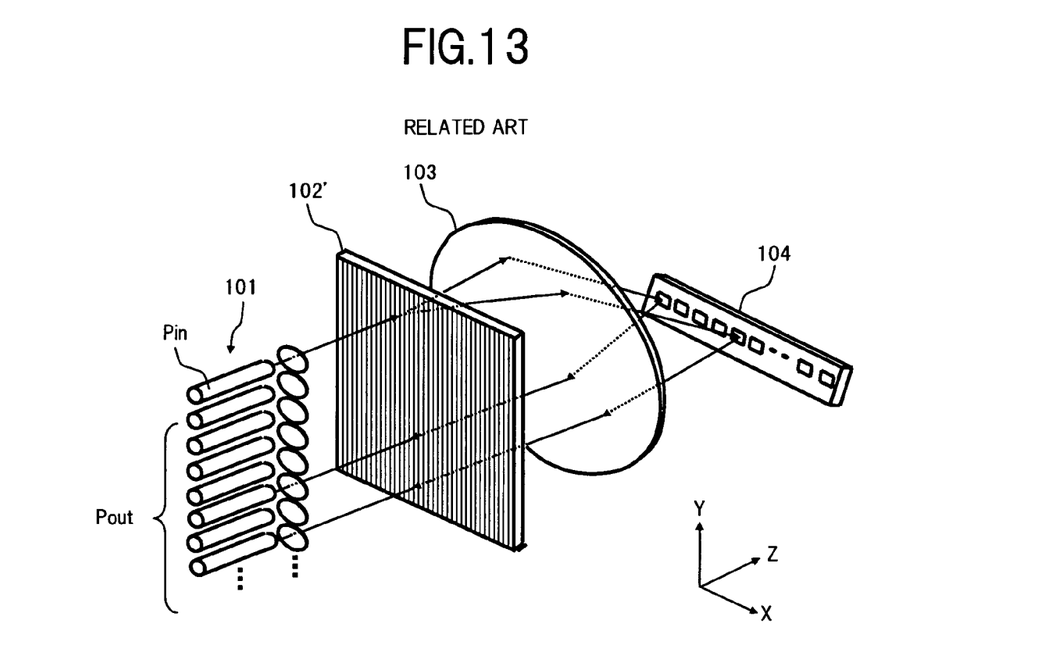
FIG. 13 is a perspective view showing a configuration example of a conventional wavelength selective switch using a transmission type diffraction grating.

FIG. 13 is a perspective view showing another configuration example of the conventional wavelength selective switch. This wavelength selective switch has a configuration same as the above configuration example shown in FIG. 12 except for that a transmission type diffraction grating 102' is used.

Incidentally, herein, a direction at which the lights of respective wavelengths are angularly dispersed by the diffraction grating is an X-direction, a direction in which the input and output ports are arranged is a Y-direction, and an optical axis direction vertical to an X-Y plane is a Z-direction.

Such a conventional wavelength selective switch has a wavelength selecting function capable of controlling the angle of the reflecting surface of each movable mirror on the mirror array 104 to select the light of arbitrary wavelength from the lights of a plurality of wavelengths contained in the input WDM light, to thereby lead the light of arbitrary wavelength to the destination output port. Further, it is also possible to reverse a relation between the input and the output, so that one of the lights supplied to a plurality of input ports is selected to be led to one output port.

Figure 14:
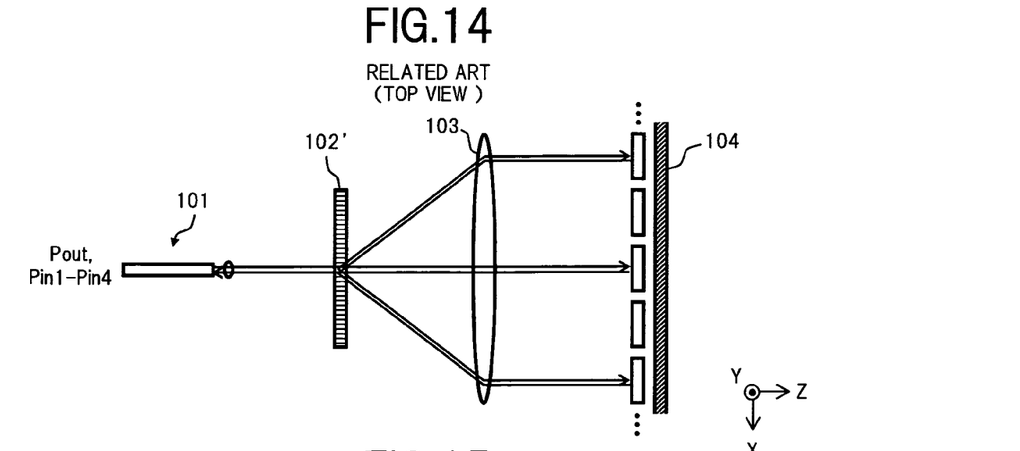
FIG. 14 is a top view showing one example in which angles of movable mirrors are offset to a Y-direction in the conventional wavelength selective switch.
Figure 15:
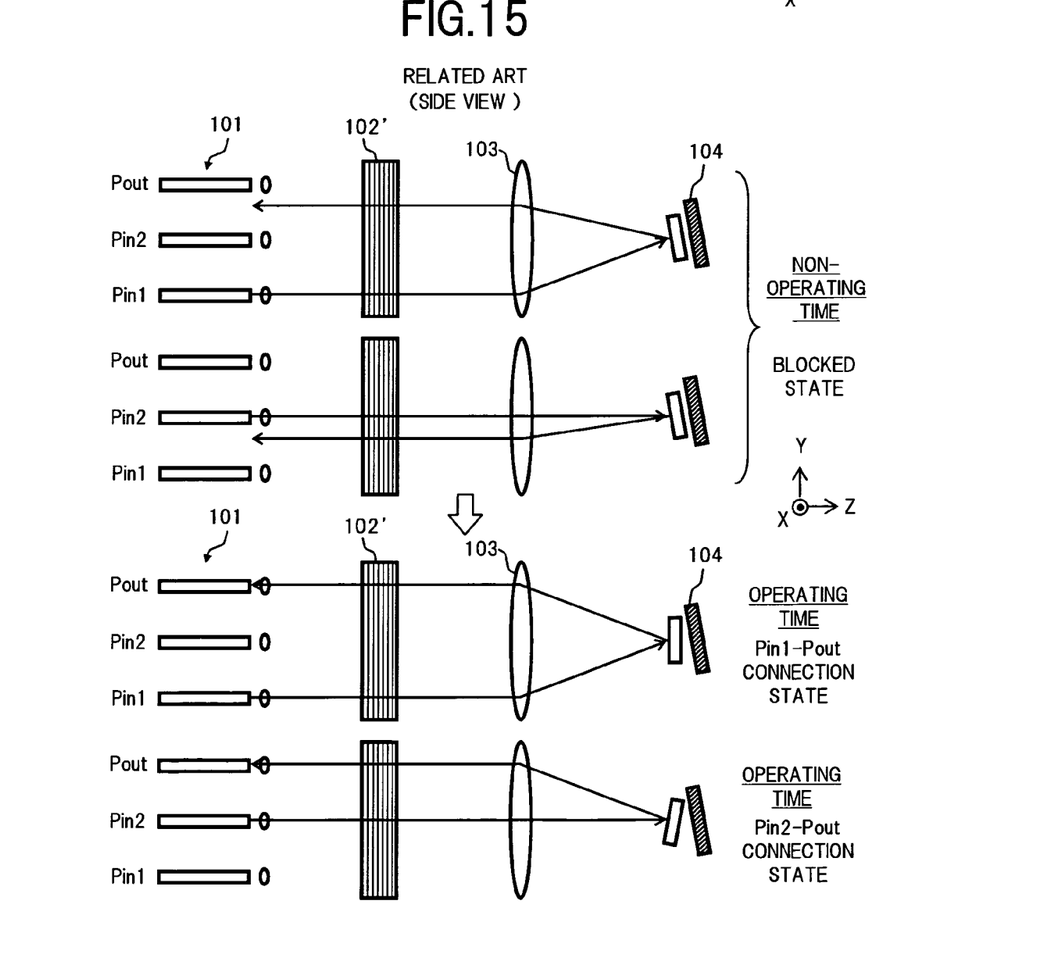
FIG. 15 is a side view showing one example in which the angles of the movable mirrors are offset to the Y-direction in the conventional wavelength selective switch.

In the conventional wavelength selective switch as described above, for blocking the connection between the input and output ports at the non-operating time, as shown in a top view of FIG. 14 and a side view of FIG. 15 for example, it can be considered that the mirror array is mounted in a state where the angle of each movable mirror at the non-operating time is intentionally offset to a direction for switching the ports (Y-direction) from a state where the connection between the input and output ports is optimum. FIG. 14 and FIG. 15 show the example in which the transmission type diffraction grating shown in FIG. 13 is used, but for the reflective type diffraction grating as shown in FIG. 12, same consideration can be made. Thus, by offsetting the angle of each movable mirror to the Y-direction, the lights which are reflected by the movable mirrors and thereafter reach the collimator array are deviated to the Y-direction at the non-operating time, and therefore, the connection between the input and output ports is blocked. Then, when the connection between the input and output ports is restored from the blocked state, by making each movable mirror to be in an operating state at a desired angle to which the above offset portion is added, a normal path is connected. Further, when the path is switched, the connection to another port is performed, by switching the operation of each movable mirror to a current angle and adding an angle according to an arrangement of pre-stage and latter-stage ports.

Figure 16:
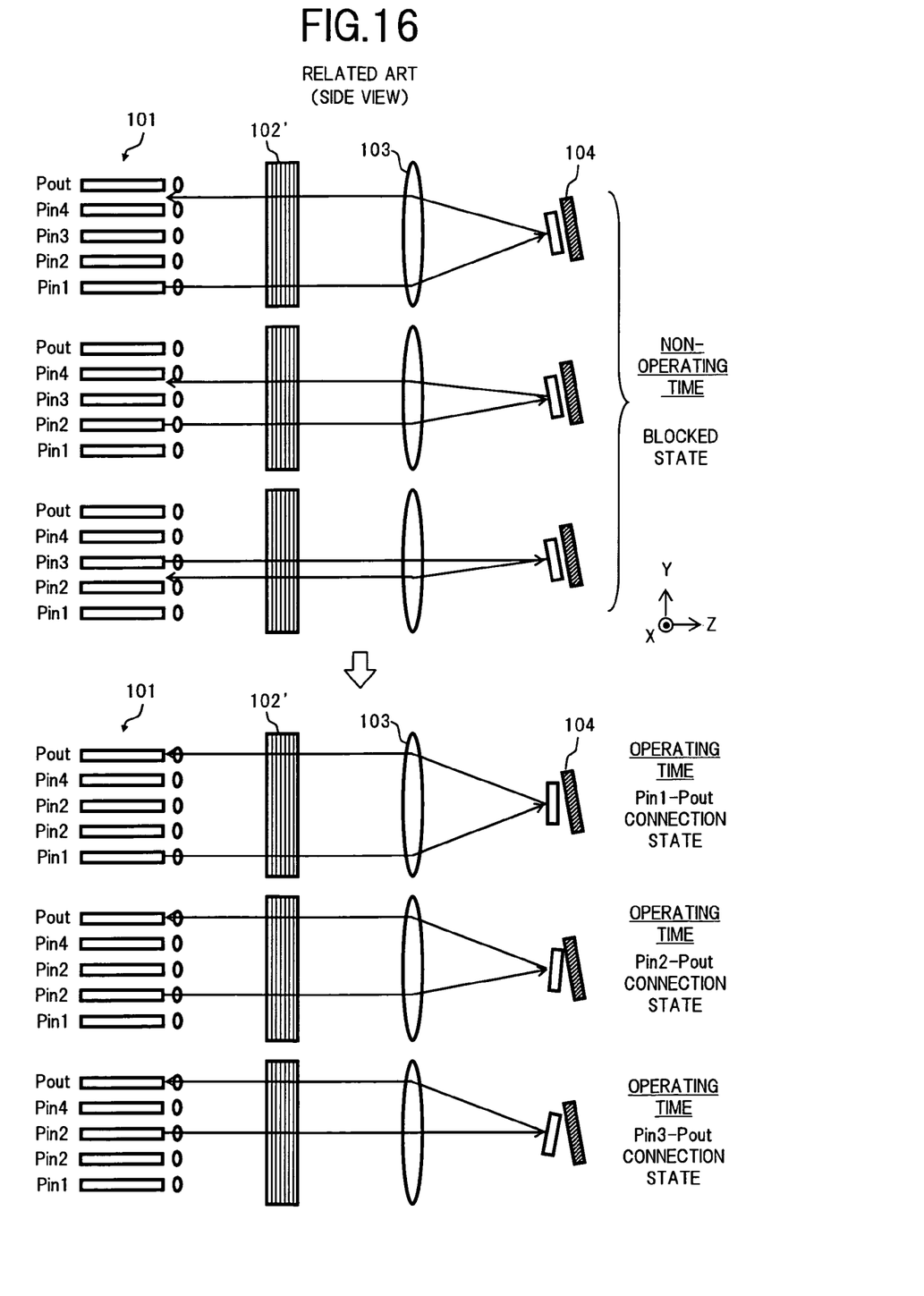
FIG. 16 is a diagram for explaining problems for when a large number of input and output ports is disposed to the conventional wavelength selective switch.

However, in the case where a large number of input and output ports is disposed to the conventional wavelength selective switch as described above, by merely offsetting the angle of each movable mirror to the Y-direction as shown in FIG. 14 and FIG. 15, it becomes hard to reliably block the connection between the input and output ports at the non-operating time. To be specific, in a wavelength selective switch including four input ports Pin1 to Pin4 and one output port Pout as shown in FIG. 16 for example, it is necessary to determine the angle of each movable mirror at the non-operating time so that the optical coupling is equal to or less than an allowable value between all the input ports and the output port inclusive of the return to the input ports. Therefore, there is caused a problem in that it becomes impossible to sufficiently respond to combinations of large number of input and output ports by merely offsetting the angle of each movable mirror to only the Y-direction.

Figure 17:
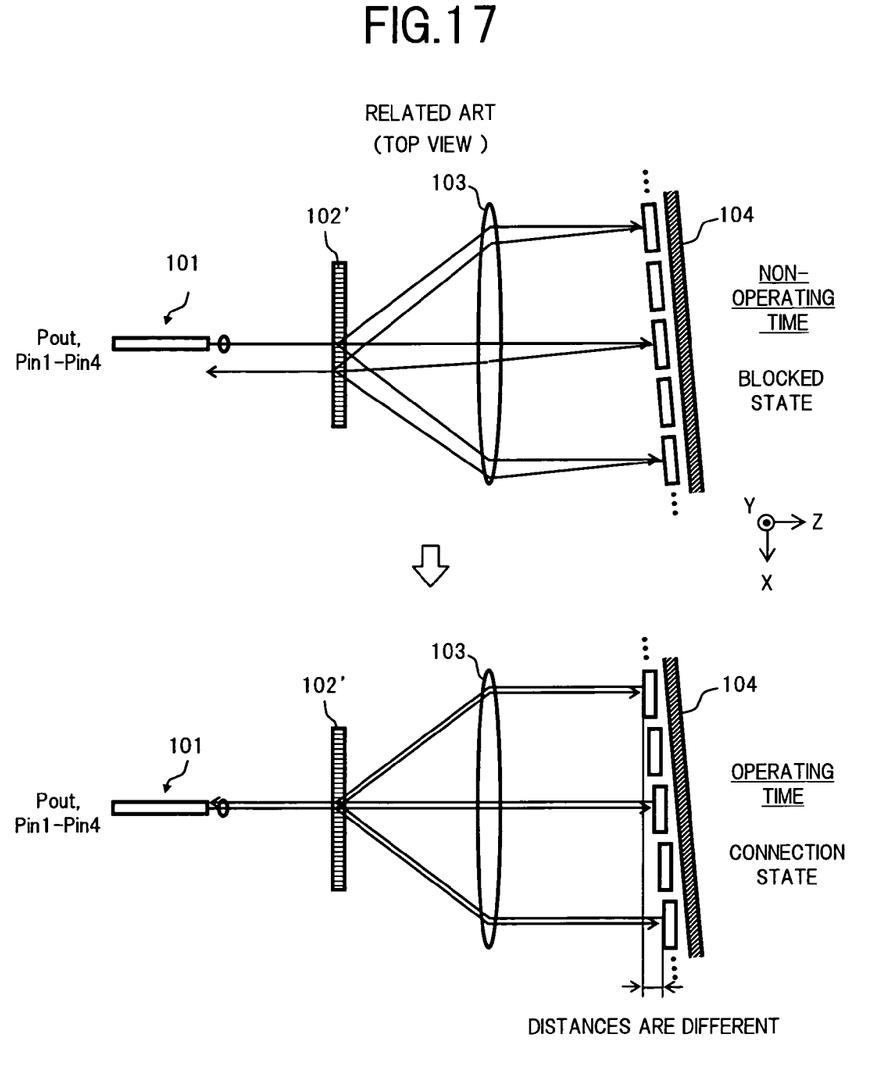
FIG. 17 is a top view showing one example in which the angles of the movable mirrors are offset to an X-direction in the conventional wavelength selective switch.

To solve the above problem, as shown in a top view of FIG. 17 for example, the angle of each movable mirror is offset to the X-direction (angular dispersion direction in the diffraction grating), and the lights which are reflected by the respective movable mirrors and thereafter reach the collimator array are deviated not to the X-direction but to the Y-direction, so that the connection between all the input and output ports can be blocked at the non-operating time.

However, in the case where the angle of each movable mirror is offset to the X-direction as described in the above, as shown in a lower stage of FIG. 17, when the input and output ports are connected at an operating time, since distances of a focal lens to the movable mirrors corresponding to the respective wavelengths on the mirror array 104 are different from each other, beam diameters of the lights condensed on the reflecting surfaces of the movable mirrors are different for each wavelength. Therefore, there are caused problems in that a loss difference occurs between the lights of respective wavelengths, which are reflected by the respective movable mirrors to be led to the output port, and also, a beam of the light condensed on the reflecting surface of each movable mirror is spread so that a wavelength band of the light becomes narrower.

SUMMARY OF THE INVENTION

The present invention has been accomplished in view of the above problems, and has an object to provide a wavelength selective switch capable of blocking the connection between an input side and output side in a non-operating time without degrading the performance at an operating time.

In order to achieve the above object, a wavelength selective switch according to the present invention comprises: an input and output optical system in which at least one input port and at least one output port are arranged in a first direction; a spectral element which separates a light output from the input port of the input and output optical system according to wavelengths, to angularly disperse the separated lights to a second direction different from the first direction; a condenser lens which condenses the lights output from the spectral element; and a mirror array including a plurality of movable mirrors whose angular variable reflecting surfaces are arranged on condensing positions of the lights of respective wavelengths condensed by the condenser lens, in which angles of the reflecting surfaces of the movable mirrors are controlled so that the lights of respective wavelengths reflected by the respective movable mirrors are led, via the condenser lens and the spectral element, to the output port which is set as the output destination of the input and output optical system. The condenser lens of the wavelength selective switch is arranged so that a center axis thereof is shifted to the second direction relative to an axis passing through the center of spreading angle to the second direction of optical beams output from the spectral element. Further, in the mirror array, at a non-operating time when the movable mirrors are not driven, the lights of respective wavelengths condensed by the condenser lens are incident on the movable mirrors by being tilted to the second direction by an offset angle corresponding to a shift amount of the center axis of the condenser lens to the second direction, whereas at an operating time when the movable mirrors are driven, the angles of the reflecting surfaces of the movable mirrors are controlled to the second direction according to the offset angle so that the lights of respective wavelengths condensed by the condenser lens are vertically incident on the movable mirrors.

In the wavelength selective switch having the above configuration, the light output from the input port of the input and output optical system is angularly dispersed according to wavelengths, to the second direction, and thereafter, the lights of respective wavelengths pass through the condenser lens to be condensed on the movable mirrors corresponding to the respective wavelengths, in the mirror array. At this time, the center axis of the condenser lens is arranged so as to be shifted to the second direction relative to the axis passing through the center of spreading angle to the second direction of output beams from the spectral element. Therefore, at the non-operating time, the lights are incident on the movable mirrors while being tilted by the offset angle corresponding to the shift amount of the condenser lens to the second direction and the lights reflected by the movable mirrors are emitted to a direction at an offset angle of two times, so that the lights of respective wavelengths to be returned to the input and output optical system via the condenser lens and the spectral element are deviated to the second direction. On the other hand, at the operating time, since the angles of the reflecting surfaces of the movable mirrors are controlled to the second direction according to the offset angle, the lights of respective wavelengths from the condenser lens are vertically incident on the movable mirrors and the lights reflected by the movable mirrors are returned to the input and output optical system via the condenser lens and the spectral element to be input to the output port set as the output destination.

According to the wavelength selective switch of the present invention, by applying the arrangement in which the center axis of the condenser lens is shifted to the second direction, propagation distances of optical beams between the condenser lens and the movable mirrors are all equal to each other, and therefore, it is possible to realize a disconnection state between the input and output ports at the non-operating time without a substantial loss difference between the lights of respective wavelengths which are led from the input port to the output port at the operating time, while ensuring excellent characteristics of respective wavelength bands. Further, since the configuration is such that the angles of the reflecting surfaces of the movable mirrors are offset to the second direction which is different from the first direction in which the input and output ports are arranged, it is also possible to reduce a maximum swinging angle of each movable mirror for when the switching of the connection between the input and output ports is made, compared with the case where the movable mirrors are offset to the first direction as in the conventional technology.

The other objects, features and advantages of the present invention will be apparent from the following description of the embodiments with reference to the accompanying drawings.

DETAILED DESCRIPTION OF THE INVENTION

Hereinafter, embodiments of the present invention will be described with reference to drawings. The same reference numerals denote the same or equivalent parts in all drawings.

Figure 1:
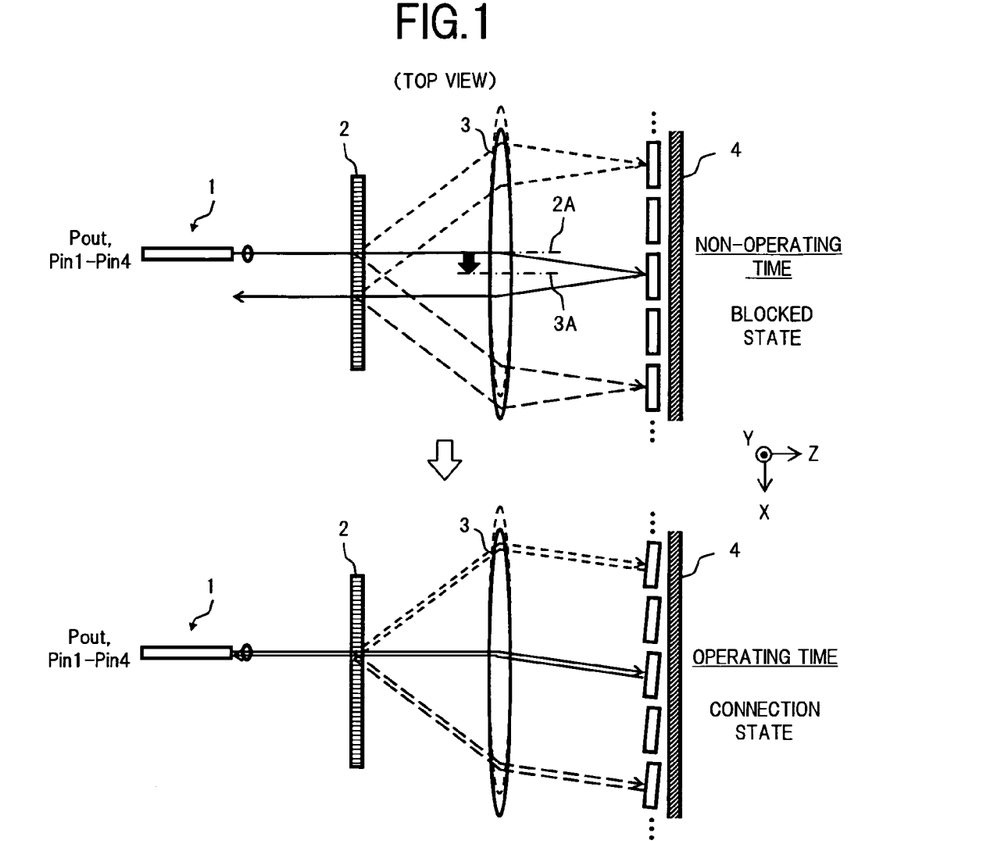
FIG. 1 is a top view showing a configuration of an essential part of a wavelength selective switch according to a first embodiment of the present invention.
Figure 2:
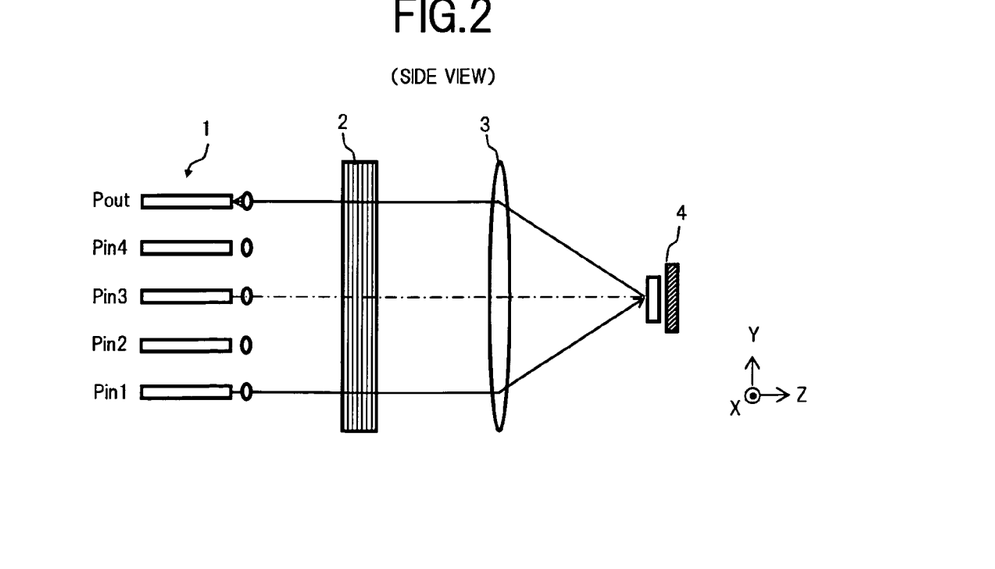
FIG. 2 is a side view showing the configuration of the essential part of the wavelength selective switch according to the first embodiment.

FIG. 1 and FIG. 2 are diagrams showing a configuration of an essential part of a wavelength selective switch according to a first embodiment of the present invention, and FIG. 1 is a top view and FIG. 2 is a side view. Incidentally, the configuration of the entirety of the present wavelength selective switch is basically same as a configuration of a conventional wavelength selective switch shown in FIG. 13.

In FIG. 1 and FIG. 2, the wavelength selective switch in the first embodiment comprises, for example: an input and output optical system 1 in which input ports Pin1 to Pin4 and an output port Pout are arranged in a first direction (Y-direction); a diffraction grating 2 serving as a spectral element, which separates lights emitted from the input ports Pin1 to Pin4 of the input and output optical system 1 according to wavelengths, to angularly disperse the separated lights to a second direction (X-direction); a condenser lens 3 which condenses the lights of respective wavelength angularly dispersed by the diffraction grating 2; and a mirror array 4 in which a plurality of movable mirrors is arranged corresponding to condensing positions of the lights of respective wavelengths condensed by the condenser lens 3. The configuration of the present wavelength selective switch differs from the conventional configuration in that, as shown by a black arrow line on an upper stage of FIG. 1, the condenser lens 3 is arranged so that a center axis 3A thereof is shifted to the X-direction relative to an axis 2A passing through the center of spreading angle to the X-direction of optical beams output from the diffraction grating 2. The present wavelength selective switch is configured such that the lights which are reflected by the movable mirrors to be returned to the input and output optical system 1 at a non-operating time are deviated to the X-direction while the movable mirrors on the mirror array 4 being arranged in parallel to the X-direction without being offset to the X-direction.

The input and output optical system 1 includes, for example, a fiber array in which five optical fibers are arranged in the Y-direction and a collimator array in which collimator lenses are arranged in the vicinity of end faces of the respective optical fibers. Here, one optical fiber positioned on an upper stage of the fiber array is set as the output port Pout, and the remaining four optical fibers are set as the input ports Pin1 to Pin4. Note, the number of optical fibers and the setting of the input and output ports are not limited to the above example.

The diffraction grating 2 is for angularly dispersing the lights which are input to the input ports Pin1 to Pin4 and are converted into parallel lights by the collimator lenses, to the X-direction according to wavelengths. Incidentally, herein, there is shown one example in which a transmission type diffraction grating is used. However, it is also possible to use a reflective type diffraction grating as shown in FIG. 12.

The condenser lens 3 which is arranged so that the center axis 3A thereof is shifted to the X-direction as described in the above, condenses the lights of respective wavelengths angularly dispersed by the diffraction grating 2 on the corresponding movable mirrors of the mirror array 4, and also, condenses the lights reflected by the movable mirrors on the diffraction grating 2. Incidentally, the arrangement of the condenser lens shown by a broken line in FIG. 1 indicates a conventional arrangement in which the center axis of the condenser lens is in conformity with a center axis 2A in the X-direction of optical beams output from the diffraction grating 2.

In the mirror array 4, a plurality of movable mirrors corresponding to maximum wavelength numbers of the lights capable to be input to the present wavelength selective switch is arranged in the X-direction. Each movable mirror is a micro-mirror which is formed by using a micro machine (MEMS) technology and an angle of a reflecting surface thereof is controllable around two axes in the X-direction and the Y-direction.

Next, there will be described an operation of the wavelength selective switch having the configuration as described in the above.

The lights input to the input ports Pin1 to Pin4 are converted into parallel lights by the collimator lenses, and thereafter, are given to the diffraction grating 2 and are separated for each wavelength to travel to the X-direction at different angles. In this state, since it is hard to perform the path switching at the movable mirrors, it is necessary to use an optical system by which the optical beams spreading from a separation point at the diffraction grating 2 toward the X-direction are made parallel to be incident on the respective movable mirrors on the mirror array 4. This optical system can be realized by arranging the collimator lens 3 using for example a convex lens or the like to be apart from the separation point at the diffraction grating 2 by a focal distance f.

In the arrangement of the condenser lens 3, by making the center axis 3A of the condenser lens 3 to be in conformity with the axis 2A passing through the center of spreading angle to the X-direction of the optical beams from the diffraction grating 2 (refer to the arrangement of the condenser lens shown by the broken line in FIG. 1), it becomes possible to output the optical beams allocated in parallel for each wavelength to a direction vertical to a lens surface of the condenser lens 3 (Z-direction). At this time, if the movable mirrors are arranged in parallel with the lens surface of the condenser lens 3, the optical beams are vertically incident on the movable mirrors (refer to FIG. 14). In such an arrangement, an incidence direction of the light to the movable mirror is same as an emission direction of the light from the movable mirror, and an adjustment of optical axis can be easily performed. Therefore, this arrangement is normally adopted.

Figure 3:
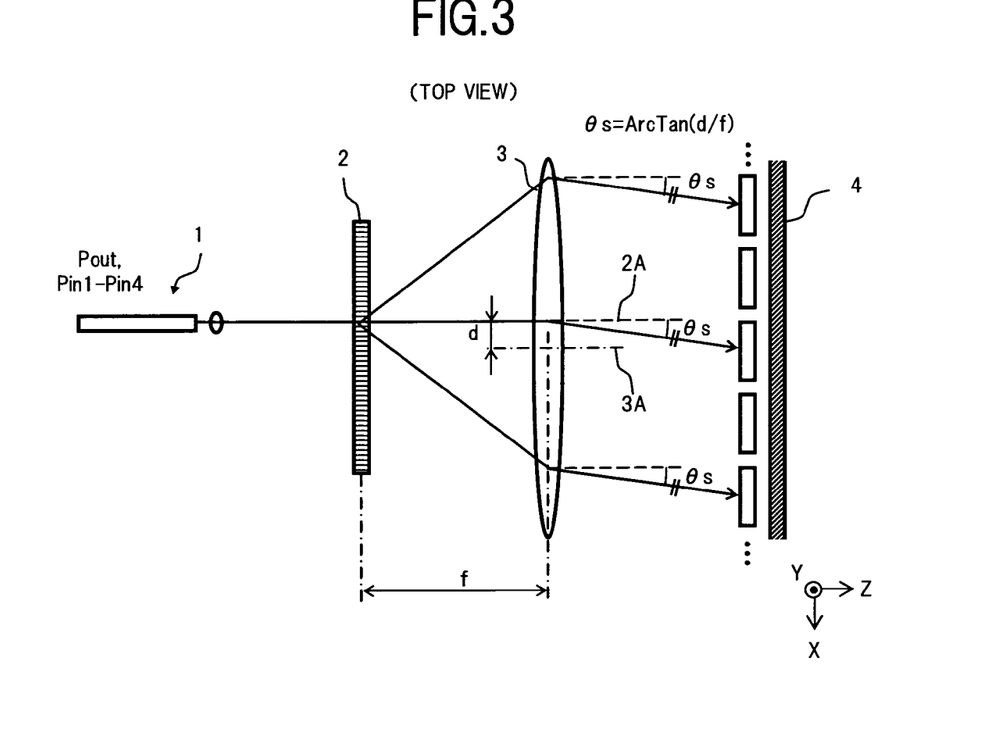
FIG. 3 is a top view for explaining an arrangement of a condenser lens in the first embodiment.

On the other hand, as shown in FIG. 3, if the center axis 3A of the condenser lens 3 is arranged to be shifted to the X-direction by a distance d relative to the center axis 2A in the X-direction of the optical beams from the diffraction grating 2, a traveling direction of the optical beams of respective wavelengths passed through the condenser lens 3 is angled by θs=Arc Tan(d/f) relative to a direction of the center axis 2A. In such an arrangement, since the optical beams incident on the respective movable mirrors allocated in parallel to the lens surface of the condenser lens 3 are tilted by the angle θs, propagation distances of the optical beams from the condenser lens 3 to the respective movable mirrors can be made all equal to each other.

Figure 4:
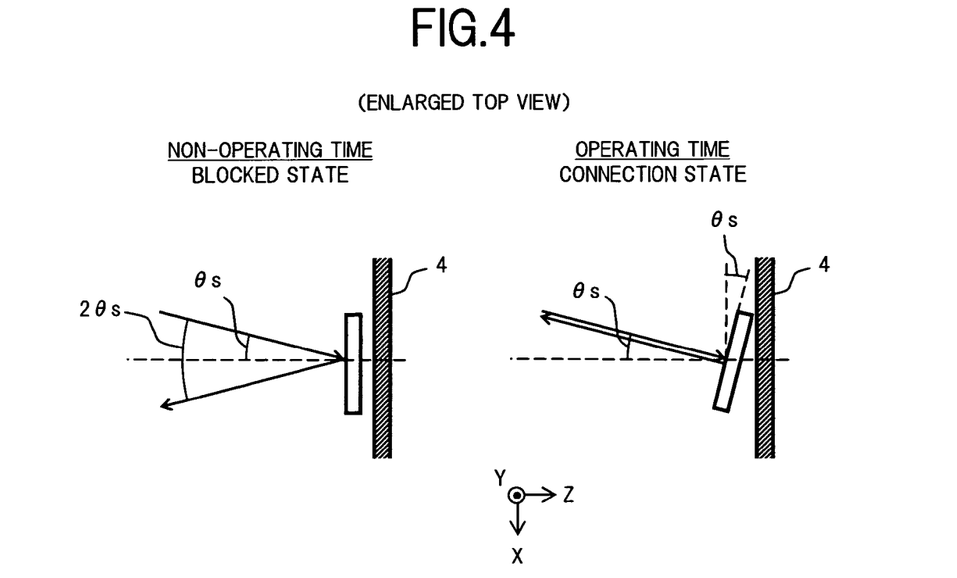
FIG. 4 is an enlarged top view for explaining an offset angle of each movable mirror in the first embodiment.

The above arrangement in which the center axis 3A of the condenser lens 3 is shifted to the X-direction is adopted into the present wavelength selective switch. Accordingly, at the non-operating time when a drive voltage is not applied on each movable mirror, as shown in an enlarged view on the left side in FIG. 4, since the reflecting surfaces of the respective movable mirrors are not angled, reflected beams of the movable mirrors are returned to a direction at an angle of 2θs relative to the incident beams. Therefore, the lights of respective wavelengths which are reflected by the movable mirrors and thereafter pass through the condenser lens 3 and the diffraction grating 2 to reach the input and output optical system 1 are deviated to the X-direction (refer to an optical path on the upper stage of FIG. 1). On the other hand, at an operating time, as shown in an enlarged view on the right side in FIG. 4, a required drive voltage is applied on each movable mirror so that the reflecting surface of each movable mirror is angled by θs, and the reflected beams of the movable mirrors are returned to the direction same as that of the incident beams so that the optical coupling between the input and output pots is performed (refer to an optical path on a lower stage of FIG. 1).

Generally, in an optical switch utilizing movable mirrors as in the present wavelength selective switch, by arranging a beam waist on the position of the reflecting surface of each movable mirror, the optical coupling between the input and output ports can be made optimum. In a Gaussian beam system, provided that a beam waist size on the reflecting surface of each movable mirror is ωL, an angle between two beams to be incident on or emitted from each movable mirror is θc and the wavelength of the light is λ, the coupling efficiency (coupling loss) between the input and output ports is $\mathrm{Exp}\{\pi^2 \cdot \theta c^2 \cdot \omega L^2/\lambda^2\}$. If such a relation is adapted to the optical system of the present wavelength selective switch, loss between the input and output ports at the non-operating time is $\mathrm{Exp}\{\pi^2 \cdot (2\theta s) \cdot \omega L^2/\lambda^2\}$. Accordingly, by determining the shit amount d of the condenser lens 3 to the X-direction so that a value of such a loss reaches a desired block amount or more, it becomes possible to block the connection between the input and output ports at the non-operating time.

Figure 5:
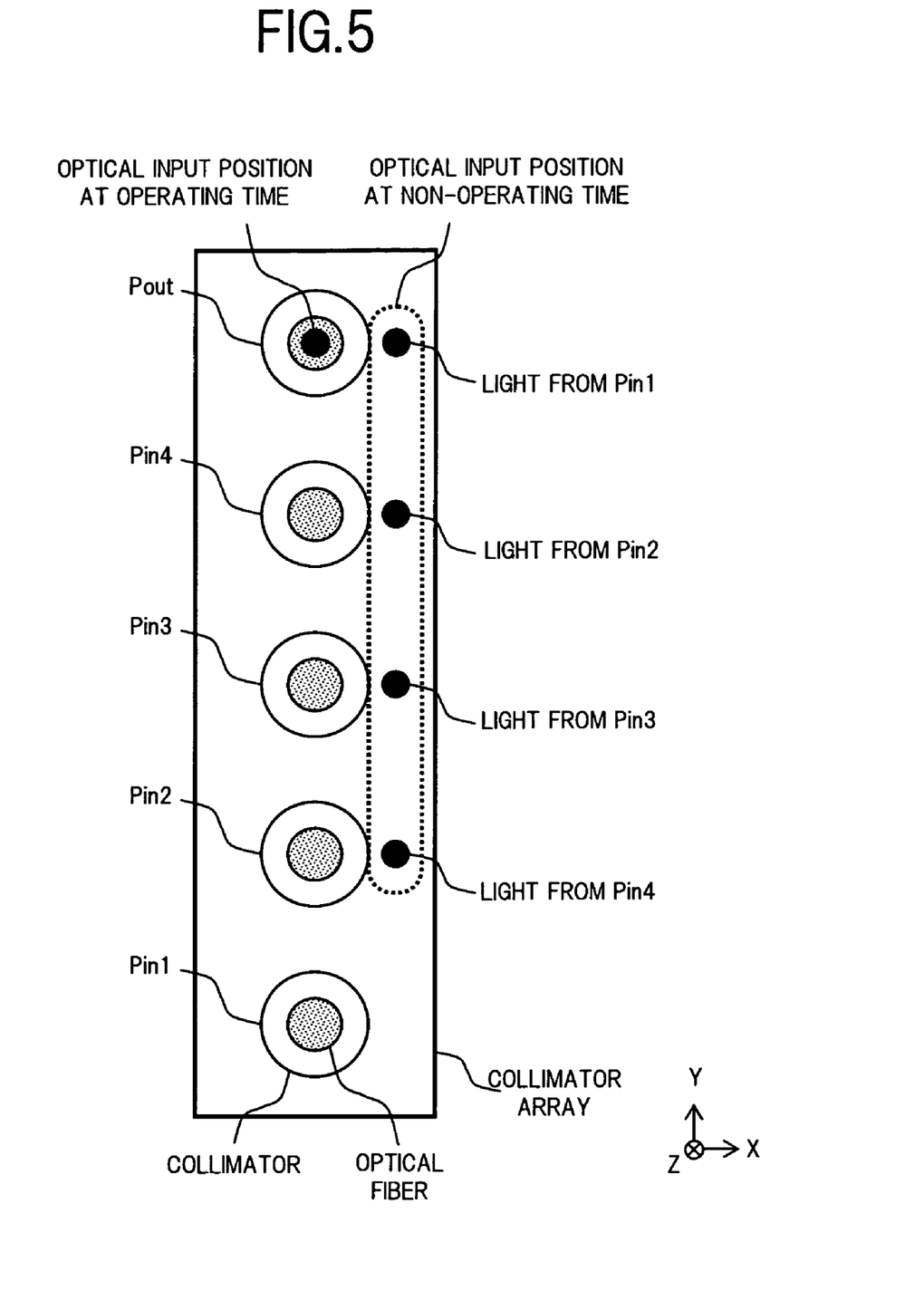
FIG. 5 is a diagram showing input positions of lights returned to the vicinity of a collimator array in the first embodiment.

FIG. 5 shows one example of input positions of the respective lights which are output from the input ports Pin1 to Pin4 to be turned, and are returned to the vicinity of the collimator array, in the wavelength selective switch according to the present embodiment. In this example, at the non-operating time, the light output from the input port Pin1 is input to a position deviated to the right side from the output port Pout, the light output from the input port Pin2 is input to a position deviated to the right side from the input port Pin4, the light output from the input port Pin3 is input to a position deviated to the right side from the input port Pin3, and the light output from the input port Pin4 is input to a position deviated to the right side from the input port Pin2, so that the connection between the input ports Pin1 to Pin4 and the output port Pout is blocked. On the other hand, at the non-operating time, the lights output from the input ports Pin1 to Pin4 are all input to the output port Pout, so that the input ports Pin1 to Pin4 and the output port Pout are connected to each other.

According to the wavelength selective switch according to the first embodiment as described above, by applying the arrangement in which the center axis 3A of the condenser lens 3 is shifted to the X-direction relative to the center axis 2A in the X-direction of the optical beams from the diffraction grating 2, the propagation distances of the optical beams between the condenser lens 3 and the movable mirrors are all equal to each other. Therefore, it becomes possible to realize a disconnection state between the input and output ports at the non-operating time, without a substantial loss difference between the lights of respective wavelengths which are led from the input ports Pin1 to Pin4 to the output port Pout at the operating time, while ensuring excellent characteristics of respective wavelength bands. Further, since the angles of the movable mirrors are offset to the X-direction which is different from the arrangement direction of the input and output ports (Y-direction), compared with the case where the angles of the movable mirrors are offset to the Y-direction as in the conventional technology, it is possible to obtain an effect of reducing a maximum swinging angle of each movable mirror for when the connection between the input and output ports is switched.

Next, there will be described a second embodiment of the present invention.

Figure 6:
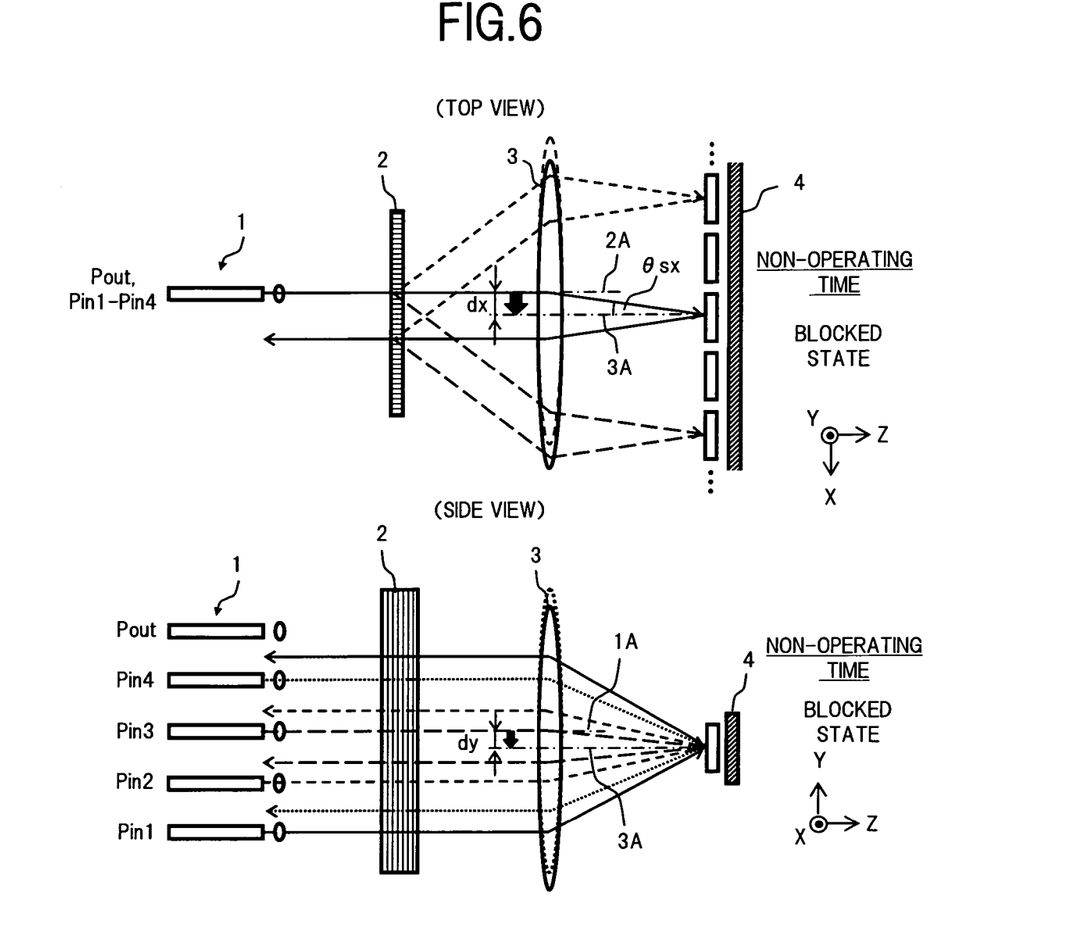
FIG. 6 is a diagram showing a configuration of an essential part of a wavelength selective switch according to a second embodiment of the present invention.

FIG. 6 is a diagram showing a configuration of an essential part of a wavelength selective switch according to the second embodiment of the present invention.

In FIG. 6, the present wavelength selective switch is an application example of the configuration in the first embodiment shown in FIG. 1 and FIG. 2, in which the center axis 3A of the condenser lens 3 is shifted not only to the X-direction but also to the Y-direction. To be specific, as shown in a black arrow line on an upper stage of FIG. 6, similarly to the first embodiment, the center axis 3A of the condenser lens 3 is shifted to the X-direction relative to the axis 2A passing through the center of spreading angle to the X-direction of the optical beams output from the diffraction grating 2. At the same time, as shown by a black arrow line on a lower stage of FIG. 6, the center axis 3A of the condenser lens 3 is shifted to the Y-direction relative to an optical axis 1A of the optical beam output from the input port Pin3 centrally positioned among the plurality of input and output ports aligned in the Y-direction. Incidentally, herein, shift amounts of the center axis 3a of the condenser lens 3 to the X-direction and the Y-direction are dx and dy, offset angles of each movable mirror to the X-direction and the Y-direction are θsx and θsy, and beam waist sizes in the X-direction and the Y-direction on the reflecting surface of each movable mirror are ωLx and ωLy.

The shift amount dx of the center axis 3A of the condenser lens 3 to the X-direction is determined so that a value of the coupling efficiency (coupling loss) $\mathrm{Exp}\{\pi^2 \cdot (2\theta sx)^2 \omega Lx^2/\lambda^2\}$ between the input and output ports at the non-operating time reaches a desired block amount or more, similarly to the shift amount d described in the first embodiment. Further, since the coupling efficiency in the Y-direction for the light output from the input port Pin1 at the non-operating time is $\mathrm{Exp}\{\pi^2 \cdot (2\theta sy)^2 \cdot \omega Ly^2/\lambda^2\}$, the shift amount dy of the center axis 3A of the condenser lens 3 to the Y-direction is determined so that a value of the coupling efficiency (coupling loss) reaches a desired block amount or more. Furthermore, the coupling efficiency in the Y-direction for the light output from each of other input ports Pin2 to Pin4 is such that the above function $\mathrm{Exp}\{\pi^2 \cdot (2\theta sy)^2 \cdot \omega L y^2/\lambda^2\}$ is overlapped at intervals of switching angle from the input port Pin1 to the input ports Pin2 to Pin4, and accordingly, the offset angle θsy of each movable mirror corresponding to each of input ports Pin2 to Pin4 is determined based on each value of the coupling efficiency and allowable cross talk to the adjacent port.

Figure 7:
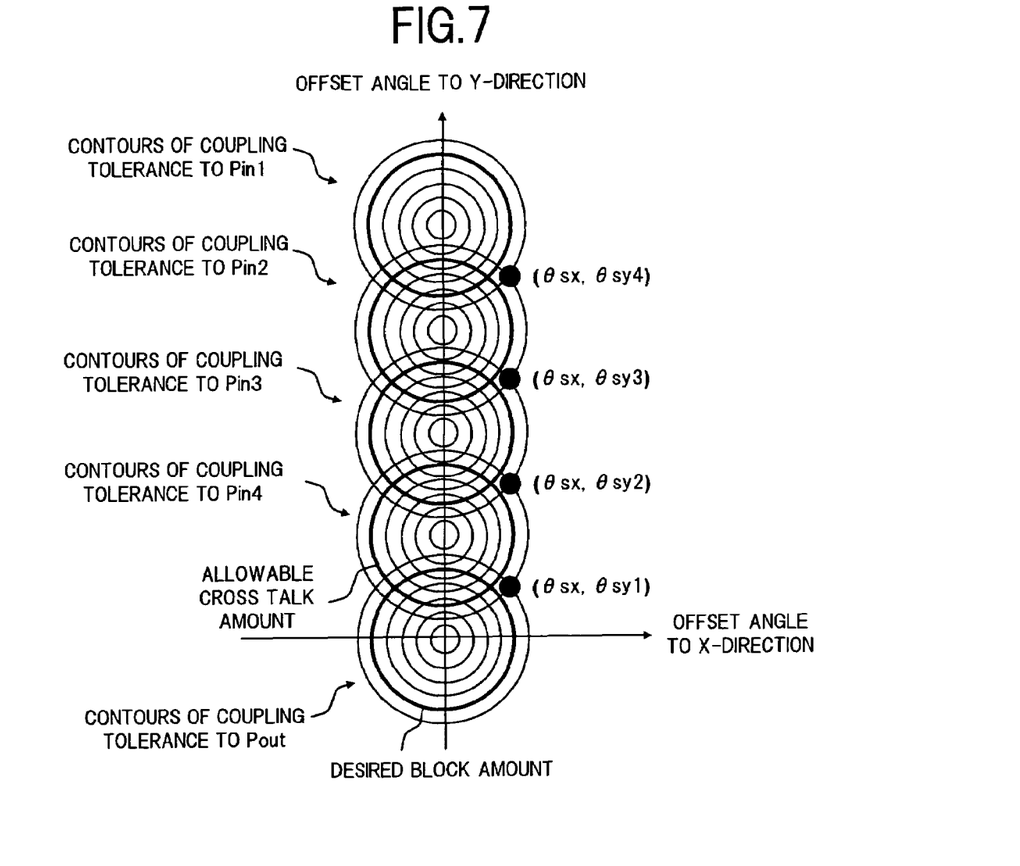
FIG. 7 is a conceptual diagram showing an offset angle of each movable mirror corresponding to each input port in the second embodiment using contours of coupling tolerance between the input and output ports.

FIG. 7 is a conceptual diagram showing the offset angle of each movable mirror corresponding to each of the input ports Pin1 to Pin4, using contours of the coupling tolerance between the input and output ports. Since the light output from the input port Pin1 at the non-operating time is reflected by the movable mirror to be led between the output port Pout and the input port Pin4 (refer to the lower stage of FIG. 6), a reaching position thereof needs to be outside of the desired block amount (bold line) on the contour of the coupling tolerance to the output port Pout and also needs to be outside of an allowable cross talk amount (bold line) on the contours of the coupling tolerance to the input port Pin4 adjacent to the output port Pout, and accordingly, (θsx, θsy1) corresponding to this reaching position are the offset angles of the movable mirror for connecting between the input port Pin1 and the output port Pout. Further, since the light output from the input port Pin2 at the non-operating time is reflected by the movable mirror to be led between the input ports Pin 3 and Pin4 (refer to the lower stage of FIG. 6), a reaching position thereof needs to be outside of the allowable cross talk amount on the contours of the coupling tolerance to the input port Pin4 and also needs to be outside of an allowable cross talk amount on the contours of the coupling tolerance to the input port Pin3, and accordingly, (θsx, θsy2) corresponding to this reaching position are the offset angles of the movable mirror for connecting between the input port Pin2 and the output port Pout. Subsequently to the above, similarly to the case of the input port Pin2, the offset angles of the movable mirror for connecting between the input port Pin3 and the output port Pout are (θsx, θsy3) and the offset angles of the movable mirror for connecting between the input port Pin4 and the output port Pout are (θsx, θsy4).

Figure 8:
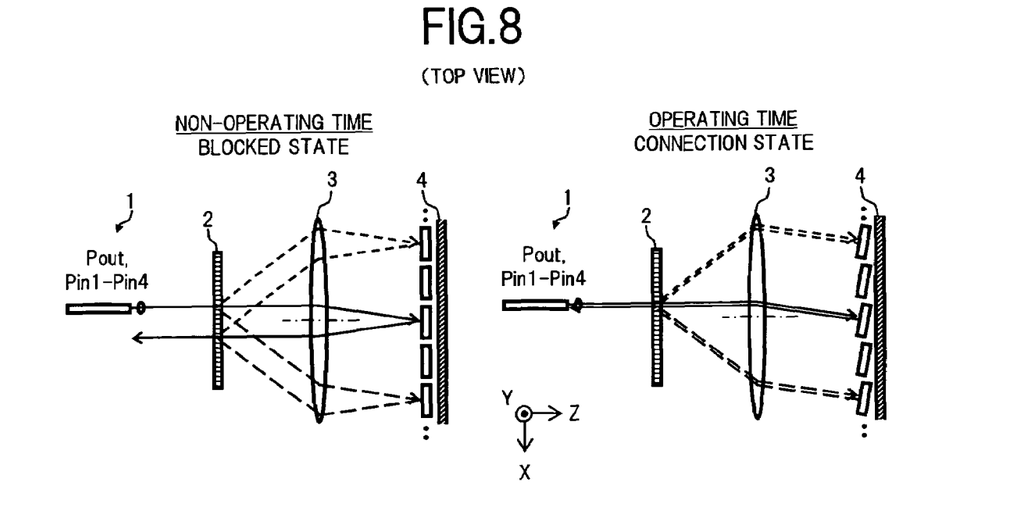
FIG. 8 is a top view for explaining the connection between the input and output ports in the second embodiment.
Figure 9:
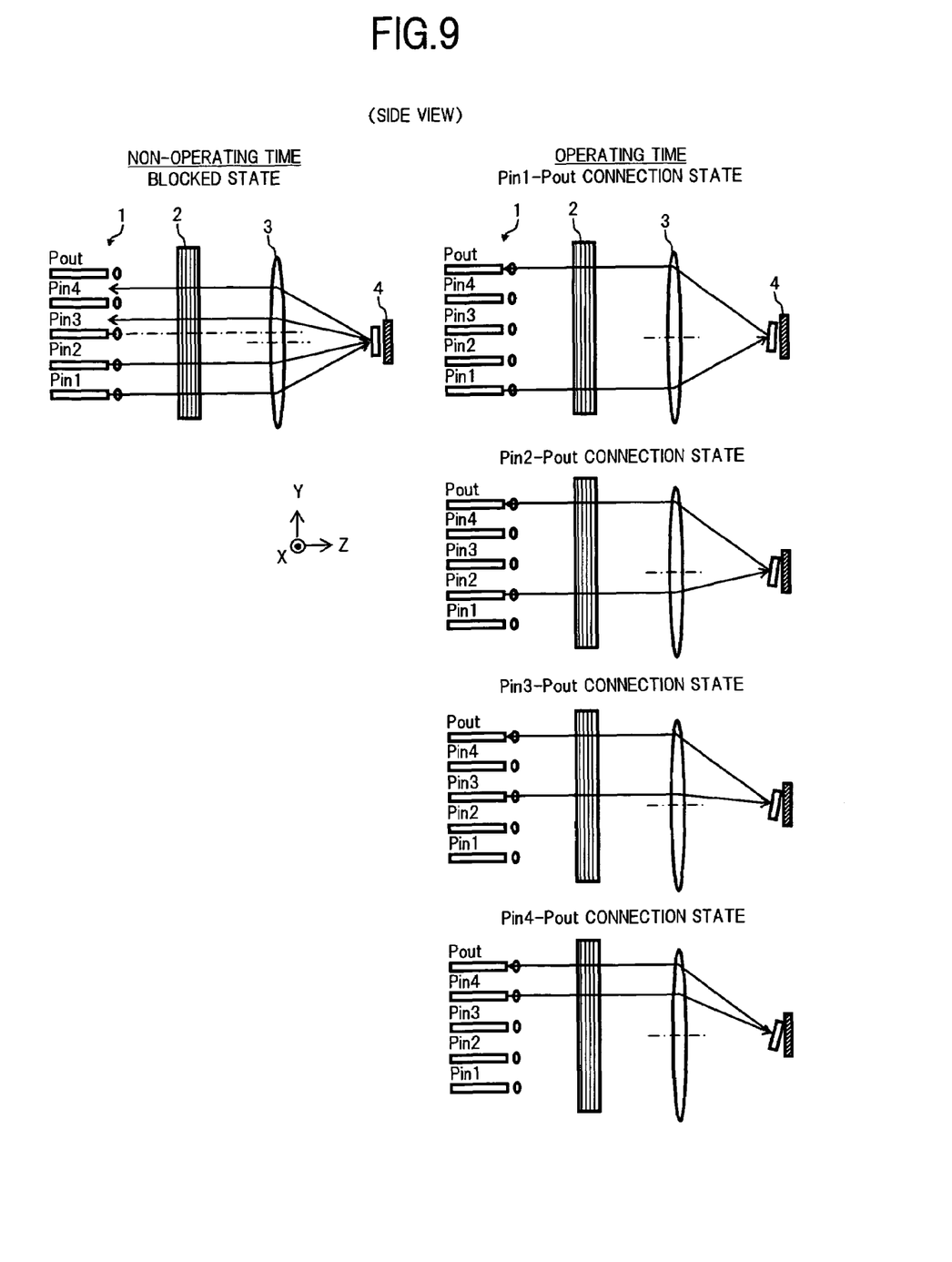
FIG. 9 is a side view for explaining the connection between the input and output ports in the second embodiment.

As described in the above, the shift amounts dx to the X-direction and the dy to the Y-direction of the center axis 3A of the condenser lens 3 and the offset angles (θsx, θsy1) to (θsx, θsy4) of the movable mirrors corresponding to the respective input ports Pin1 to Pin4 are determined, so that, as shown in a top view of FIG. 8 and a side view of FIG. 9, the disconnection state between the input and output ports is realized at the non-operating time, whereas at the operating time, the drive voltage corresponding to the offset angles is applied on each movable mirror so that the lights output from the input ports Pin1 to Pin4 are input to the output port Pout, thereby realizing a connection state between the input and output ports.

As described above, according to the wavelength selective switch in the second embodiment, even in the case of applying the arrangement in which the center axis 3A of the condenser lens 3 is shifted to the X-direction and to the Y-direction, the propagation distances of the optical beams between the condenser lens 3 and the respective movable mirrors are all equal to each other, and therefore, it becomes possible to realize the disconnection state between the input and output ports at the non-operating time without the substantial loss difference between the lights of respective wavelengths which are led from the input ports Pin1 to Pin4 to the output port Pout at the operating time, while ensuring the excellent characteristics of the respective wavelength bands. Further, by shifting the center axis 3A of the condenser lens 3 to the Y-direction, it is possible to further reduce the offset angle of each movable mirror to the X-direction, compared with the first embodiment.

Figure 10:
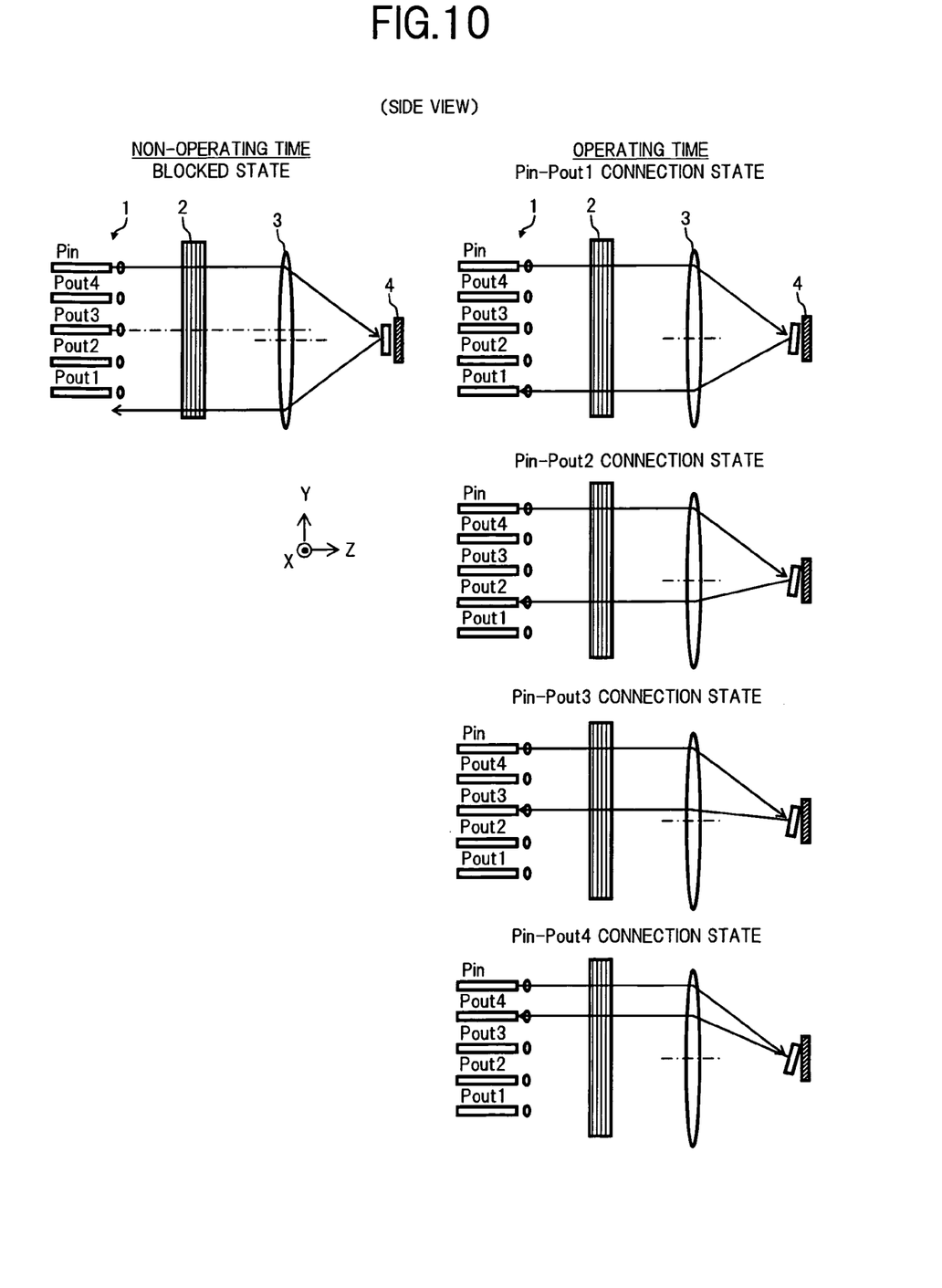
FIG. 10 is a side view showing one example in which a relation between an input side and an output side is reversed, relating to the second embodiment.

Incidentally, in the above first and second embodiments, there has been described the wavelength selective switch including four input ports and one output port. However, by reversing a relation between the input side and the output side, it is possible to apply the configuration of the present invention to a wavelength selective switch including one input port and four output ports. FIG. 10 is a side view showing a disconnection state at the non-operating time and a connection state at the operating time for the case where the relation between the input side and the output side in the second embodiment is reversed. Thus, even in the configuration in which a light output from one input port Pin is led to four output ports Pout1 to Pout4 according to wavelengths, similarly to the second embodiment, by applying the arrangement in which the center axis 3A of the condenser lens 3 is shifted to the X-direction and the Y-direction, at the non-operating time, the light output from the input port Pin is led to a position deviated outwardly from the output port Pout1 so that the connection between the input and output ports is blocked. At the operating time, the reflecting surfaces of the movable mirrors corresponding to the respective wavelengths are controlled at the offset angles corresponding to the output port being the connecting destination, so that the input port Pin is connected to the output ports Pout1 to Pout 4.

Figure 11:
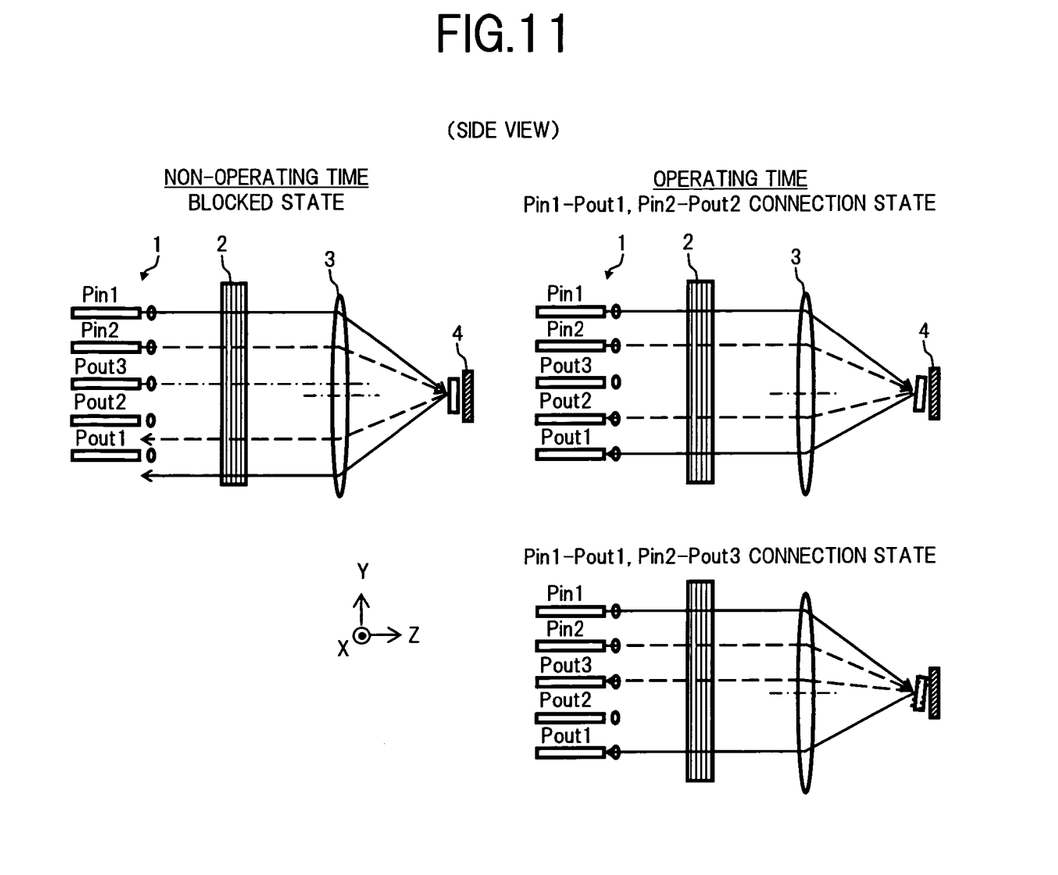
FIG. 11 is a side view showing one example in which the configuration of the present invention is applied to a wavelength selective switch of 2-inputs and 3-outputs, relating to the second embodiment.

Further, the four input ports and one output port or the one input port and four outputs ports has been shown as the configuration example of input and output ports of the wavelength selective switch,. However, it is evident that the configuration of the present invention is effective for a wavelength selective switch including M input ports and one output port, or one input port and M output ports. Further, it is possible to apply the configuration of the present invention to a wavelength selective switch including M input ports and N output ports (provided that N is integer equal to or larger than 2). For example, for a wavelength selective switch including two input ports and three output ports, in the case of applying the arrangement in which the center axis 3A of the condenser lens 3 is shifted to the X-direction and the Y-direction, as shown in a side view of FIG. 11, at the non-operating time, the light output from the input port Pin1 is led to a position deviated outwardly from the output port Pout1, and also, the light output from the input port Pin2 is led between the output ports Pout1 and Pout2, so that the connection between the input and output ports is blocked. At the operating time, the reflecting surfaces of the respective movable mirrors are controlled to the offset angles corresponding to the connection setting of the input and output ports, so that the input port Pin1 is connected to the output ports Pout1 to Pout3, and the input port Pin2 is connected to the output ports Pout1 to Pout3.

What is claimed is:

1. A wavelength selective switch comprising:
    an input-output optical system in which at least one input port and at least one output port are arranged in a first direction;
    a spectral element which separates a light output from the at least one input port of the input-output optical system according to wavelengths, to angularly disperse the separated lights in a second direction different from the first direction;
    a condenser lens which condenses the separated lights output from the spectral element; and a mirror array including a plurality of movable mirrors whose angularly variable reflecting surfaces are arranged on condensing positions of the separated lights of respective wavelengths condensed by the condenser lens, in which angles of the reflecting surfaces of the movable mirrors are controlled so that the lights of respective wavelengths reflected by the respective movable mirrors are led, via the condenser lens and the spectral element, to the at least one output port which is set as an output destination of the input-output optical system, wherein the condenser lens is arranged so that a center axis thereof is shifted in the second direction relative to an axis passing through a center of a spreading angle in the second direction of the separated lights output from the spectral element, and in the mirror array, at a non-operating time when the movable mirrors are not driven, the lights of respective wavelengths condensed by the condenser lens are incident on the movable mirrors by being tilted in the second direction by an offset angle corresponding to a shift amount of the center axis of the condenser lens in the second direction, whereas at an operating time when the movable mirrors are driven, the angles of the reflecting surfaces of the movable mirrors are controlled in the second direction according to the offset angle so that the lights of respective wavelengths condensed by the condenser lens are normally incident on the movable mirrors.

2. A wavelength selective switch according to claim 1, wherein the shift amount of the center axis of the condenser lens in the second direction is determined so that a loss between the at least one input and output port at the non-operating time is equal to or larger than a predetermined set block amount.

3. A wavelength selective switch according to claim 1, wherein the offset angle $\theta s$ is expressed as $\theta s = \text{Arc Tan}(d/f)$, using a focal distance $f$ of the condenser lens and the shift amount $d$ of the center axis of the condenser lens in the second direction.

4. A wavelength selective switch according to claim 1, wherein the condenser lens is arranged so that the center axis thereof is shifted in the first direction relative to an optical axis of an optical beam input to or output from a port centrally positioned between the at least one input and output ports aligned in the first direction, and in the mirror array, at the non-operating time, the lights of respective wavelengths condensed by the condenser lens are incident on the movable mirrors by being tilted in the first direction by the offset angle corresponding to the shift amount of the center axis of the condenser lens in the first direction and an arrangement of the at least one input port from which the corresponding light is output, whereas at the operating time, the angles of the reflecting surfaces of the movable mirrors are controlled in the first direction according to the offset angle and the arrangement of the port being the output destination.

5. A wavelength selective switch according to claim 4, wherein the respective shift amounts of the center axis of the condenser lens in the first and second directions are determined so that a loss between the at least one input and output port at the non-operating time is equal to or larger than a previously set block amount and also a cross talk with an adjacent port becomes smaller than a previously set allowable value.

6. A wavelength selective switch according to claim 1, wherein the input-output optical system includes a plurality of input ports and one output port.

7. A wavelength selective switch according to claim 1, wherein the input-output optical system includes one input port and a plurality of output ports.

8. A wavelength selective switch according to claim 1, wherein the input-output optical system includes a plurality of input ports and a plurality of output ports.

* * * * *

UNITED STATES PATENT AND TRADEMARK OFFICE
CERTIFICATE OF CORRECTION

PATENT NO. : 7,636,503 B2
APPLICATION NO. : 12/073896
DATED : December 22, 2009
INVENTOR(S) : Tsuyoshi Yamamoto et al.

It is certified that error appears in the above-identified patent and that said Letters Patent is hereby corrected as shown below:

Column 12, claim 4, line 6, change "and output ports aligned" to --and output port aligned--.

Signed and Sealed this

Ninth Day of March, 2010

David J. Kappos
*Director of the United States Patent and Trademark Office*